(12) United States Patent
Boeck et al.

(10) Patent No.: US 9,772,011 B2
(45) Date of Patent: Sep. 26, 2017

(54) DRIVE CONVERTER DEVICE AND AXLE TRANSMISSION DEVICE WITH A DRIVE CONVERTER DEVICE

(71) Applicant: ZF Friedrichshafen AG, Friedrichshafen (DE)

(72) Inventors: Alois Boeck, Hutthurm (DE); Tobias Stampflmeier, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 158 days.

(21) Appl. No.: 14/457,307

(22) Filed: Aug. 12, 2014

(65) Prior Publication Data
US 2015/0040696 A1 Feb. 12, 2015

(30) Foreign Application Priority Data
Aug. 12, 2013 (DE) .................. 10 2013 215 849

(51) Int. Cl.
*G05G 1/00* (2006.01)
*F16H 21/16* (2006.01)
(Continued)

(52) U.S. Cl.
CPC .......... *F16H 21/16* (2013.01); *F16H 25/186* (2013.01); *F16D 2023/123* (2013.01);
(Continued)

(58) Field of Classification Search
CPC ................... F16H 21/16; F16H 25/186; F16H 2063/3093; F16D 2023/123; F16D 2125/36
(Continued)

(56) References Cited

U.S. PATENT DOCUMENTS 3,304,808 A * 2/1967 Grant ..................... F16H 1/32
475/173
4,368,808 A * 1/1983 Teraoka .................. F16D 43/02
192/36
(Continued)

FOREIGN PATENT DOCUMENTS

DE 10 2011 079 957 A1 1/2013

OTHER PUBLICATIONS

German Patent Office Search Report, May 22, 2014.

*Primary Examiner* — Zakaria Elahmadi
(74) *Attorney, Agent, or Firm* — Dority & Manning, P.A.

(57) ABSTRACT

A drive converter device is provided for converting a rotational drive of a drive device into a translational actuation movement for a shifting element of a transmission unit with a cam disk that is rotatable and adjustable in an axial direction is described. The cam disk is formed with track areas with defined gradients, in the area of which the cam disk is in operative connection with at least one fixed-housing element. The cam disk is translationally adjustable in respect of the elements through rotational movement of the cam disk, depending on the gradients of the track areas. Furthermore, an axle transmission device with a shifting element is described; in the area of which, an operative connection between a shaft of a differential and a shaft connectable with a wheel of a vehicle axle is able to be produced. The shifting element is able to be actuated by the drive converter device.

11 Claims, 6 Drawing Sheets

(51) Int. Cl.
*F16H 25/18* (2006.01)
*F16D 23/12* (2006.01)
*F16D 125/36* (2012.01)
*F16H 63/30* (2006.01)

(52) U.S. Cl.
CPC .. *F16D 2125/36* (2013.01); *F16H 2063/3093* (2013.01); *Y10T 74/18296* (2015.01)

(58) Field of Classification Search
USPC .................. 74/23, 550; 475/220, 249, 173
See application file for complete search history.

(56) References Cited

U.S. PATENT DOCUMENTS

| | | | |
|---|---|---|---|
| 7,806,797 B2* | 10/2010 | Gassmann | F16D 28/00 192/54.52 |
| 2002/0055409 A1* | 5/2002 | Kanazawa | B60K 17/346 475/249 |
| 2006/0011001 A1* | 1/2006 | Showalter | B60K 23/0808 74/23 |
| 2007/0010366 A1* | 1/2007 | Larin | F16D 41/064 475/249 |
| 2009/0294224 A1* | 12/2009 | Sakashita | F16D 65/183 188/72.2 |
| 2012/0037472 A1 | 2/2012 | Rosemeier et al. | |
| 2012/0255828 A1 | 10/2012 | Baasch et al. | |
| 2013/0277166 A1* | 10/2013 | McCrary | F16D 27/115 192/84.91 |
| 2014/0116180 A1 | 5/2014 | Keller et al. | |

* cited by examiner

DRIVE CONVERTER DEVICE AND AXLE TRANSMISSION DEVICE WITH A DRIVE CONVERTER DEVICE

FIELD OF THE INVENTION

The invention relates to a drive converter device and an axle transmission device with a drive converter device, the drive converter device converts a rotational drive of a drive device into a translational actuation movement for a shifting element of a transmission unit with a cam disk that is rotatable and adjustable in an axial direction.

A device for converting a rotational drive of a drive device into a translational drive movement, which is designed as a so-called "ball-ramp system," is known from DE 10 2005 053 555 B3. Such ball-ramp systems typically translate a rotational movement of a first device or ramp disk connected to an electric motor into an axial adjustment movement of a second, non-rotating device or ramp disk. Advantageously, ball-ramp systems make available a high transmission ratio with a simultaneously small required installation space, particularly for an arrangement around a rotating axis.

On their front surfaces facing towards each other, the ramp disks feature an equally large number of ball tracks running in a circumferential direction, the ball track of which is designed with a varying gradient. During a control of a ball-ramp system, by turning the rotating ramp disk as a control objective, either an axial position or an axial force of the non-rotating ramp disk is used. For adjusting the axial position of the non-rotating ramp disk, a twist angle of the electric motor is typically measured, from which, starting as precisely as possible at the axial position, the non-rotating ramp disk can be closed.

However, it is disadvantageous that, during the conversion of the rotational drive into the translational drive movement, the rolling elements that are arranged between the ramp disks and are typically designed as balls do not roll as desired; rather, if there is an unfavorable course of the operating state, they pass over into a slipping state, at which frictional forces increase, which impairs the operating behavior of ball-ramp systems to an undesirable extent. In addition, the known ball-ramp systems are still characterized by high construction costs and a required installation space that is not always available to the necessary extent, in particular in the area of axle transmission devices.

SUMMARY

Therefore, the present invention is subject to the task of making available a drive converter device that is favorable for installation space and an axle transmission device that is favorable for installation space, both of which are operable to a desired extent. Additional objects and advantages of the invention will be set forth in part in the following description, or may be obvious from the description, or may be learned through practice of the invention.

In accordance with the invention, the objects are achieved with a drive converter device and with an axle transmission device with the characteristics set forth herein.

The drive converter device in accordance with the invention for converting a rotational drive of a drive device into a translational actuation movement for a shifting element of a transmission unit is formed with a cam disk that is rotatable and adjustable in an axial direction.

In accordance with the invention, the cam disk is formed with track areas with defined gradients, in the area of which the cam disk is in operative connection with at least one fixed-housing element, such that the cam disk is translationally adjustable in respect of the elements through the rotational movement of the cam disk, depending on the gradients of the track areas.

Thus, compared to the conventionally designed drive converter devices, the drive converter device in accordance with the invention is designed in a manner that is favorable for installation space, with only one cam disk and at least one fixed-housing support point attached in the housing.

In addition, based on the rolling elements that are unnecessary, the drive converter device in accordance with the invention is also operable to a desired extent, since any slipping of the rolling elements arranged between two ramp disks and the high frictional forces that arise from this are avoided.

If a bearing unit is provided between the at least one element and the track areas, the drive converter device in accordance with the invention is operable with low frictional forces.

With low-cost embodiments of the drive converter device in accordance with the invention, the bearing unit is formed as a slide bearing or a roller bearing.

If the element is formed in the shape of a bolt, the drive converter device in accordance with the invention is characterized by a simple design and low required installation space, and can be manufactured at low cost.

If the at least one bolt-shaped element is connected to the cam disk running perpendicular to the translational operating direction of the cam disk, there is a line contact between the element and the cam disk in the area between the cylindrical lateral surface of the element and a track area of the cam disk, which under certain circumstances minimizes the tilting moments arising from the manufacturing tolerances and applied to the cam disk.

In contrast to this, if, in a further embodiment of the drive converter device, the at least one bolt-shaped element is in operative connection with a track area of the cam disk in the direction of the translational operating direction of the cam disk running with the cam disk, preferably in the area of a front surface designed in a spherical cap shape, by which there is a point contact between the element and the cam disk, which brings about only small frictional forces during operation.

If a spring device engages at the cam disk, the spring force of which counteracts the actuating force that is able to be introduced from the drive device into the cam disk, it is ensured in a constructively simple manner that the cam disk, upon a non-applying actuating force of the drive device, is transferable from the spring device into a preferred operating state or a defined translational position, in which there is a shifting element of a transmission unit that is able to be actuated by the drive converter device, for example in an open or in a closed operating state.

If, in each case, two track areas are provided sequentially in the circumferential direction of the cam disk for the at least one fixed-housing element, which upon a same direction of rotation of the cam disk are able to be driven through successively by the at least one fixed-housing element, whereas an axial position of the cam disk upon the driving through of the track areas, starting from the beginning of the first track area to the end of the first track area, passes over from a first end position to a second end position, and subsequently thereto is transferred from the beginning of the second track area, which connects directly to the end of the first track area, up to the end of the second track area, which in turn connects a beginning of the additional first track area, from the second axial end position back into the first axial end position, a translational drive movement accompanying the first operating direction is adjustable independent of a translational actuation movement equivalent to the second operating direction, since, for this purpose, two different track areas are driven over, and in each case these are not necessary for the other actuation movement. In a constructively simple manner, this solution offers the option of flexibly configuring the axial operating direction of the cam disk through the rotation angle of the cam disk with varying path and force gradients, and being able to adjust this to the respective application.

If the drive converter device in the area of the disk is actuated only in a direction of rotation, the drive device advantageously can be dimensioned to a small size, and thus able to be carried out in a manner that saves installation space and costs.

In order to adjust an actuation profile of the shifting element of a transmission unit acting together with the drive converter device through a rotational movement of the cam disk to a desired extent, at least one of the track areas features at least two track sections with different gradients.

If at least one of the track areas features a track section formed as a rest area, by means of which the cam disk is able to be held within a defined translational position, the shifting element acting together with the cam disk is able to be held in a preferred operating state without holding forces to be applied in the area of the drive device or an electric motor.

The use of the drive converter device in accordance with the invention enables, preferably, the slow closing and rapid opening of a shifting element or a clutch. There is also the option of driving the cam disk always in the same direction of rotation, in order to put into effect an opening and a closing of the shifting element through an axial drive movement. Through the consistent further rotating of the cam disk, the at least one fixed-housing element comes into the system after every shifting in the area of the next track system.

In order to, in a simple manner, use an asymmetrical balance of forces between an opening process and a closing process of a shifting element, which is able to be shown through the drive converter device, a revolving cam disk with a connect spring can be used. Through a drive device preferably designed as an electric motor, the cam disk is able to be twisted; upon a high transmission ratio and the slow axial shifting arising from this, the connecting spring is preloaded. If the spring is preloaded, the drive motion of the drive device for the element found in a track section of a track area, designed with a low gradient, is essentially reduced to zero, by which the drive converter device is able to be held in a preloaded operating state without additional energy consumption. For the axial actuation of an assembly, such as a control sleeve, the cam disk of the drive converter device is further twisted, and, with a corresponding design of the track areas, there is a transition of the element into a low transmission ratio area of the drive converter device, with a simultaneous release of the spring force and a corresponding axial adjustment of the cam disk. Thereby, the stored spring force takes effect, and a sliding sleeve or the like is rapidly and powerfully able to be shifted to a desired extent.

The shifting element actuated by the drive converter device may be formed either as a positive-locking shifting element or a friction-locking shifting element. In order to vary the transfer capacity of a friction-locking shifting element in the direction of larger or smaller values and to adjust flexible turning moment transmission characteristics in the area of such a shifting element, the cam disk of the drive device is to be actuated in both directions of rotation. If the drive converter device is used (for example) in torque vectoring systems, the shifting element formed as a friction clutch or a multi-disk clutch may be operated in a slipping state, in which a selected transfer capacity of the shifting element is able to be adjusted through the drive converter device.

The axle transmission device in accordance with the invention is designed with a shifting element, in the area of which an operative connection between a shaft of a differential and a shaft connectable with a wheel of a vehicle axle is able to be produced.

Given that the shifting element is able to be actuated through the drive converter device in accordance with the invention, the axle transmission device is able to be designed in a manner that saves installation space to a desired extent and is operable in the required extent.

If the shifting element is formed as a positive-locking shifting element, for the shifting of the shifting element, shifting forces that are lower than those for friction-locking shifting elements are to be expended. Thus, there is also the option of, in a simple manner, producing the cam disk both as cost-effective sintering material and as plastic generated from only low manufacturing costs.

With an additional embodiment of the axle transmission device in accordance with the invention that is able to be produced with low costs and in a manner that saves installation space, a drive device allocated to the drive converter device is formed as an electric motor.

If the electric motor in the area of a motor output shaft is in operative connection with the cam disk through a transmission, the electric motor is, depending on the transmission ratio in the area of the transmission, correspondingly small and thus able to be carried out in a cost-effective manner.

With a constructively simple embodiment of the axle transmission device or the drive converter device in accordance with the invention, the cam disk is designed with a toothed gearing area, which meshes with a gear wheel of the transmission and the tooth width of which is adjusted to the axial travel path of the cam disk. Thus, the cam disk is able to be driven from the drive device through the entire operating area of the drive converter device to a desired extent and in a constructively simple manner.

If the cam disk is arranged through a bearing unit rotatably on one shifting element half of the shifting element, and the translational actuation movement of the cam disk is transferable through the bearing unit to the half of the shifting element, the shifting element is, in a manner that is particularly favorable for installation space, switchable between an open operating state and a closed operating state through the drive converter device.

Both the characteristics specified in the claims and the characteristics specified in the subsequent embodiments of the object under the invention are, by themselves alone or in any combination with one another, suitable for providing additional forms for the object under the invention. In terms of the additional forms of the object under the invention, the particular combinations of characteristics do not represent a limitation; rather, they are essentially solely of an exemplary nature.

BRIEF DESCRIPTION OF THE DRAWINGS

Additional benefits and advantageous embodiments of the object under the invention arise from the embodiments described below, with reference to the drawing in terms of principle, whereas, in the interests of clarity, the same reference signs are used for structurally equivalent and functionally equivalent components.

The following is shown.

DETAILED DESCRIPTION

Figure 1:
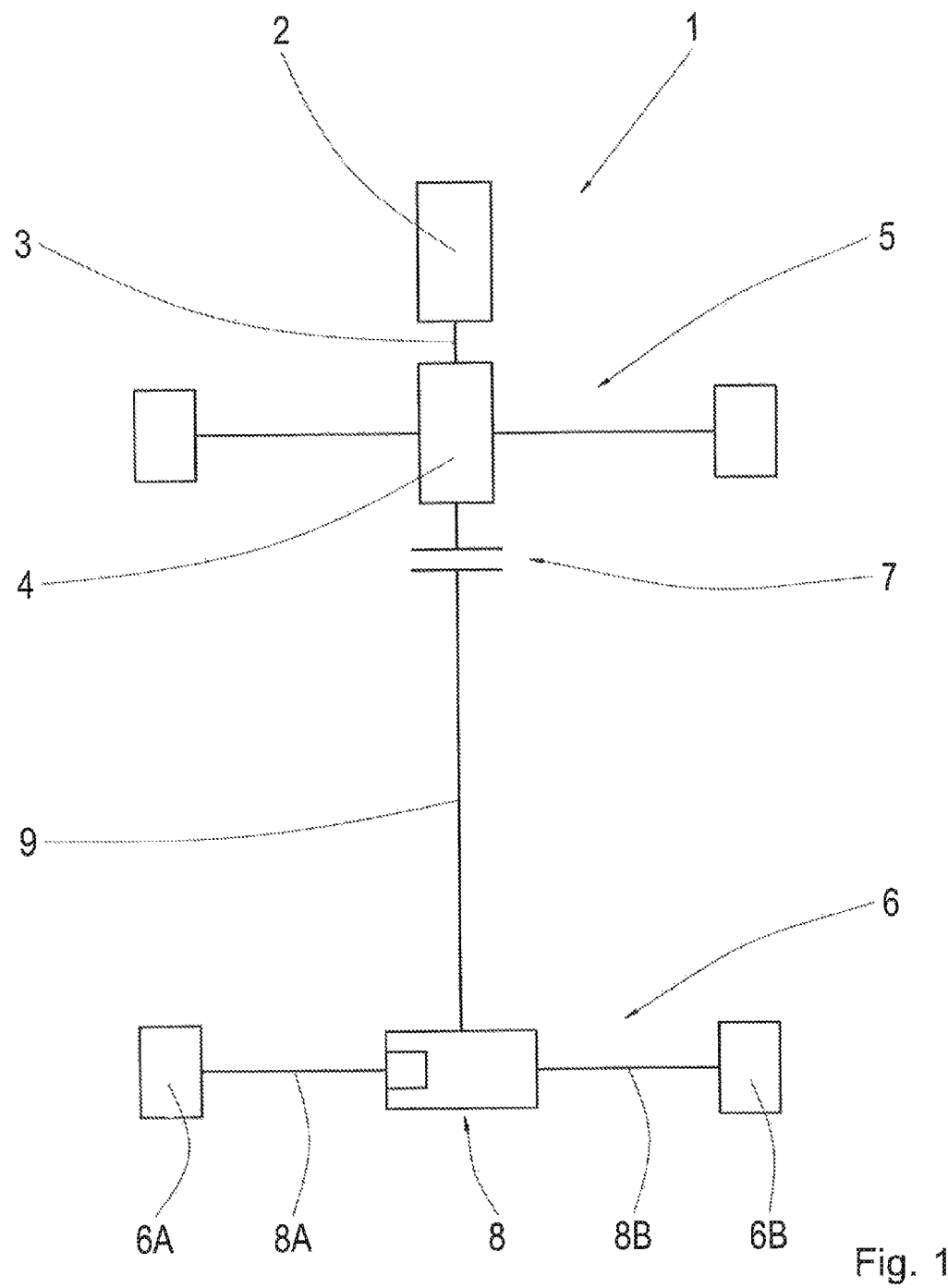
FIG. 1 a schematic representation of a vehicle drive train with an axle transmission device and a drive converter device.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a highly schematized representation of a vehicle drive train 1 with a drive unit 2, which is connected to a transmission unit 4 in the area of a motor output shaft 3. In the area of the transmission unit 4, multiple transmission ratios for forward and reverse travel are able to be represented in a known manner. A first vehicle axle 5, which in this case is the vehicle front axle, is able to be loaded with the turning moment of the drive unit 2 through the transmission unit 4 and is permanently coupled with the drive unit 2 through the transmission unit. A second vehicle axle 6 is likewise able to be coupled with a transmission output of the transmission device unit 4 through a distribution device 7, which in this case is designed as a so-called "hang-on clutch," by which the turning moment of the drive unit 2 is able to be led in the direction of the second vehicle axle 6, depending on the operating state. An axle transmission device 8 is provided in the area of the second vehicle axle 6; through this, the turning moment fed through the distribution device 7 in the vehicle longitudinal direction of the second vehicle axle 6 is able to be fed in the vehicle transverse direction to the drive wheels 6A and 6B through so-called "side shafts" 8A, 8B.

Figure 2:
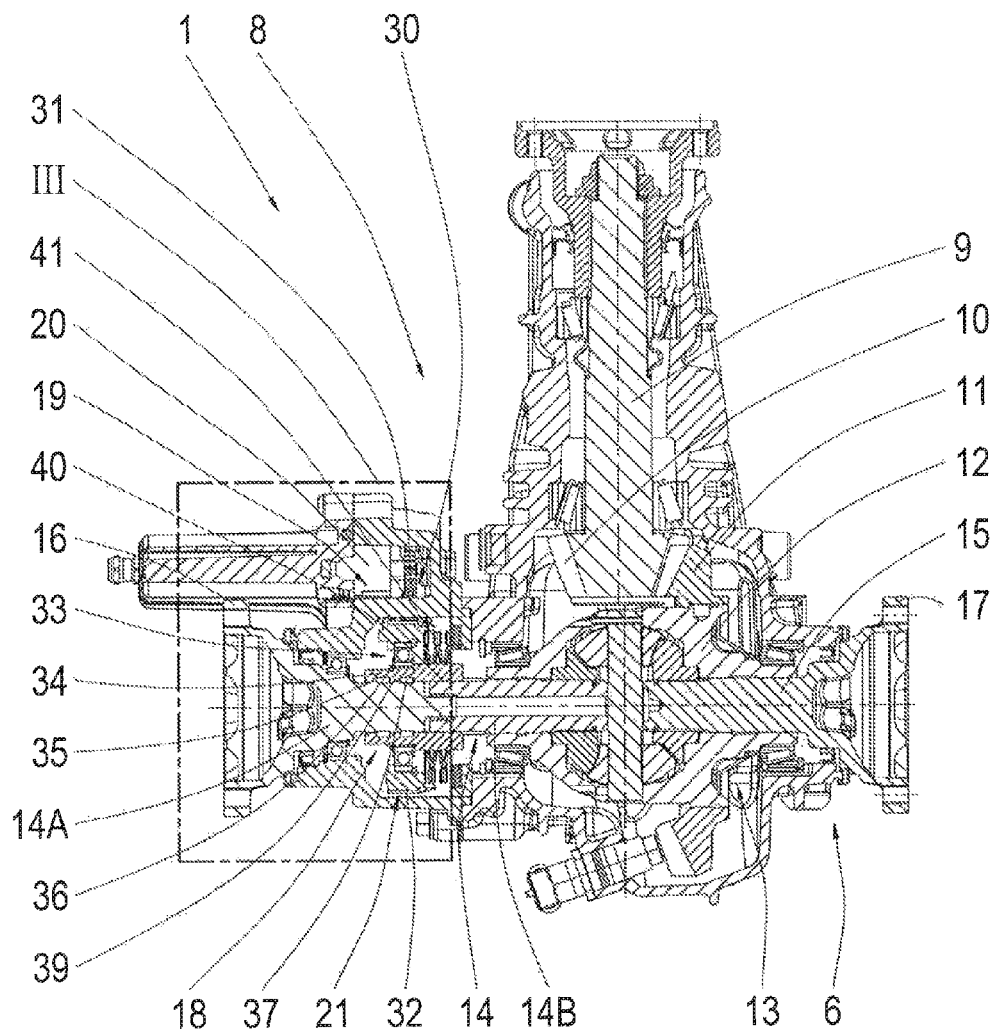
FIG. 2 a section view of the axle transmission device and the drive converter device according to FIG. 1.

In FIG. 2, a schematized section view of the axle transmission device 8 is shown, in the area of which a longitudinal shaft 9 connected to the distribution device 7 meshes with a crown wheel 11 through a bevel wheel 10. In this case, the crown wheel 11 is connected in a torque-proof manner to a differential basket 12 of a differential 13 of the axle transmission device 8. In the area of the differential shafts 14 and 15 running in the vehicle transverse direction, the differential 13 is able to be brought into operative connection with the side shafts 8A and 8B through the output flanges 16, 17.

In order to drive a vehicle designed with the vehicle drive train 1 in the area of both vehicle axles 5 and 6, the operative connection between the transmission unit 4 and the second vehicle axle 6 in the area of the distribution device 7 is produced by closing the hang-on clutch. If, in contrast to this, there is a demand for driving a vehicle designed with the vehicle drive train 1 solely in the area of the first vehicle axle 5, the operative connection is opened in the area of the distribution device 7, by which no turning moment is led from the drive unit 2 through the transmission unit 4 in the direction of the second vehicle axle 6.

To minimize the power losses in the area of the axle transmission device 8, the axle transmission device 8 in the area of the differential shaft 14 is formed with a positive-locking shifting element 18, through which a first part 14A of the differential shaft 14 is connectable in a torque-proof manner with a second part 14B of the differential shaft 14. In the open operating state of the shifting element 18, the first part 14A is separated from the second part 14B of the differential shaft 14, and thus no turning moment is able to be led from the first part 14A in the direction of the second part 14 B of the differential shaft 14. In the area of the differential 13, in the open operating state of the shifting element 18, no compensatory actions are to be carried out between the drive wheels 6A and 6B or the side shafts 8A and 8B, as the case may be. At that point, the longitudinal shaft 9 remains stationary during the operation of the vehicle designed with the vehicle drive train 1, by which only small power losses arise in the area of the axle transmission device 8.

Figure 3:
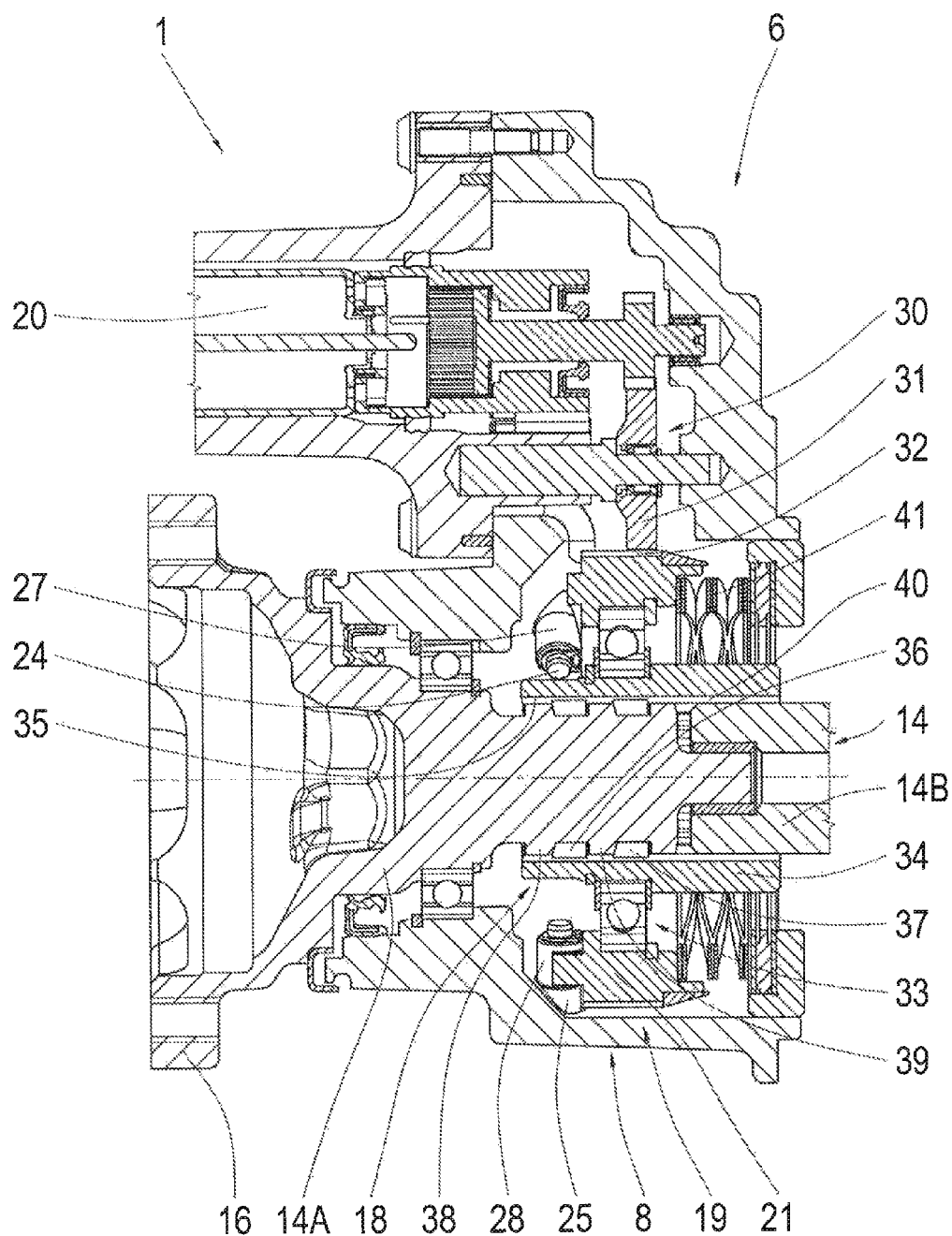
FIG. 3 an enlarged representation of an area III more specifically described in FIG. 2, which includes the drive converter device.
Figure 4:
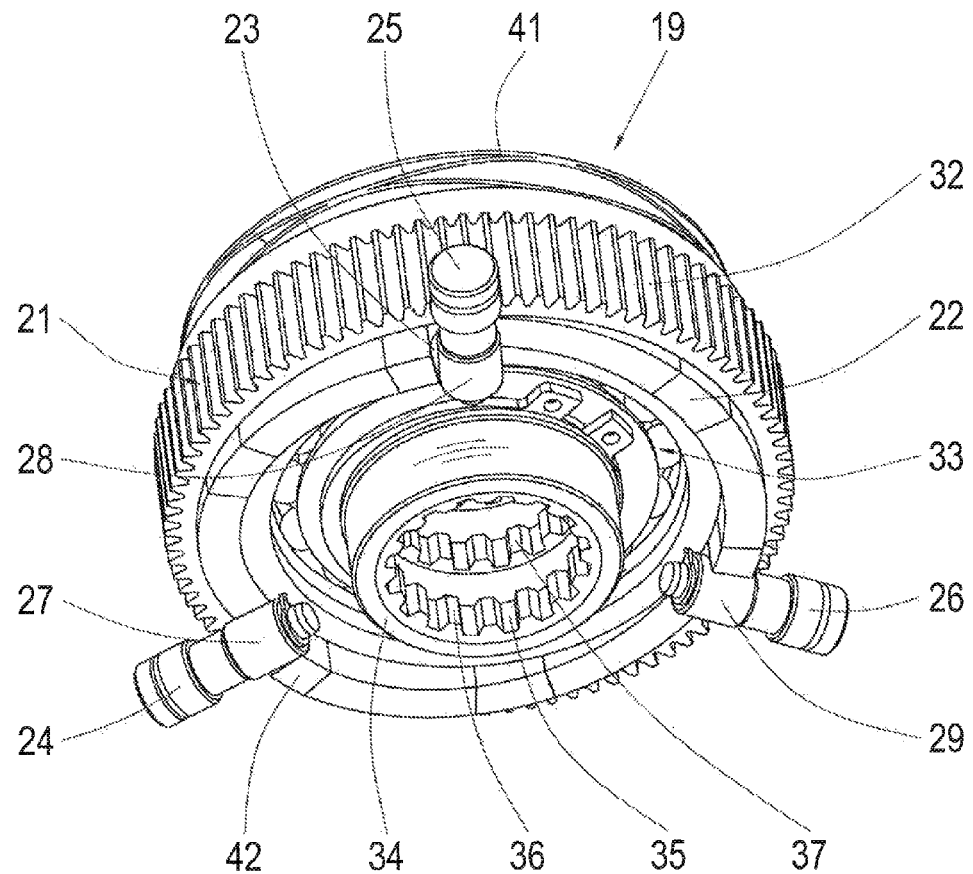
FIG. 4 a three-dimensional partial view of the drive converter device according to FIG. 2 and FIG. 3.

For the actuation of the shifting element 18, a drive converter device 19 is provided; this is represented in more detail in FIG. 3. In the area of the drive converter device 19, a rotational drive of a drive device 20, in this case designed as an electric motor, is converted into a translational actuation movement for the shifting element 18 in the manner more specifically described below. The drive converter device 19 includes a cam disk 21, in turn represented in enlarged form in FIG. 4, which is able to be set in rotation by the drive device 20 and is adjustable in an axial direction. For this purpose, the cam disk 21 is formed with track areas 22, 23 with defined gradients, in the area of which the cam disk 21 is in operative connection with fixed-housing elements 24 to 26, in order to be able to adjust the cam disk 21 translationally or in an axial direction in respect of the elements 24 to 26 through the rotational movement of the cam disk 21, depending on the gradients of the track areas 22 and 23.

In this case, the elements 24 to 26 are formed in the shape of bolts, whereas roller bearings 27 to 29 are provided between the elements 24 to 26 and the track areas 22 and 23 of the cam disk 21, in order to minimize any friction between the elements 24 to 26 designed in a fixed housing and the track areas 22, 23 of the cam disk 21. In this case, a transmission 30 designed as a helical gearbox is provided between the drive device 20 and the cam disk 21, whereas a gear wheel 31 of the transmission 30 meshes with a tooth gearing area 32 of the cam disk 21. The tooth gearing area 32 is provided in an external circumferential range of the cam disk 21 and is designed with such a tooth width that the gear wheel 31 securely meshes with the tooth gearing area 32 through the overall axial travel path of the cam disk 21.

In an internal diameter area of the cam disk 21, the cam disk 21 is arranged rotatably on a control sleeve 34 of the shifting element 18 through a bearing unit 33, in this case designed as a deep groove ball bearing, through which radial forces are transferable as axial forces. Thus, an axial actuation movement of the cam disk 21 triggered by the rotational drive of the drive device 20 is transferable through the bearing unit 33 to the control sleeve 34, in order to connect the first part 14A with the second part 14B of the differential shaft 14 through the control sleeve 34, or to release the operative connection between the two parts 14A and 14B of the differential shaft 14.

The control sleeve 34 is designed in an internal radius area 35 with tooth profiles 36, 37, which, through the shifting of the control sleeve 34, are able to be brought into a mesh in a positive-locking manner with the corresponding tooth profiles 38, 39 of the first part 14A of the differential shaft 14, or are able to be led from the mesh with the tooth profiles 38, 39 of the first part 14A of the differential shaft 14. Moreover, the control sleeve 34 is in a permanent, positive-locking connection with the second part 14B of the differential shaft 14 through a corresponding tooth gearing 40.

On the side of the cam disk 21 turned away from the elements 24 to 26, the spring device 41 abuts on the cam disk 21; the spring force of the spring device counteracts the actuating force that is able to be introduced through the drive device 20 into the cam disk 21. The shifting element 18 is transferable into its open operating state through the drive device 20 counter to the spring force of the spring device 41 through the axial adjustment of the cam disk 21 and the control sleeve 34 in operative connection with it through the bearing unit 33. With the switched-off electric motor 20, the actuating force acting in the direction of opening of the shifting element is no longer applied at the shifting element 18, by which the shifting element 18 is transferable by the spring force of the spring device 41 in its closed operating state.

In this case, the shifting element 18 is transferred upon the driving over of the second track area 22 of the cam disk 21 through the elements 24 to 26 in their open operating state, whereas this takes place with a corresponding actuation of the cam disk 21 through the drive device 20. If the shifting element 18 is in a fully open operating state, the elements 24 to 26 are arranged in so-called "rest areas" 42 of the second track areas 22, which are essentially designed with a gradient equal to zero, by which the shifting element 18 is able to be held in an open operating state with low holding forces on the part of the drive device 20. If there is a corresponding request to close the shifting element 18, the cam disk 21 is driven through the drive device 20 in the same direction of rotation as before while driving the second track areas 22 through the elements 24 to 26, until the elements 24 to 26 reach the first track areas 23, which are designed with a gradient that is substantially larger than that of the second track areas 22. If the elements 24 to 26 arise in the first track areas 23, the drive device 20 is preferably switched off, and the cam disk 21 is twisted and axially adjusted from the spring device 41 and the abutting elements 24 to 26 to an extent closing the shifting element 18, until the elements 24 and 26, in reference to the axial operating direction of the cam disk 21, in turn abuts on the lowest point of the second track areas 22.

Figure 5:
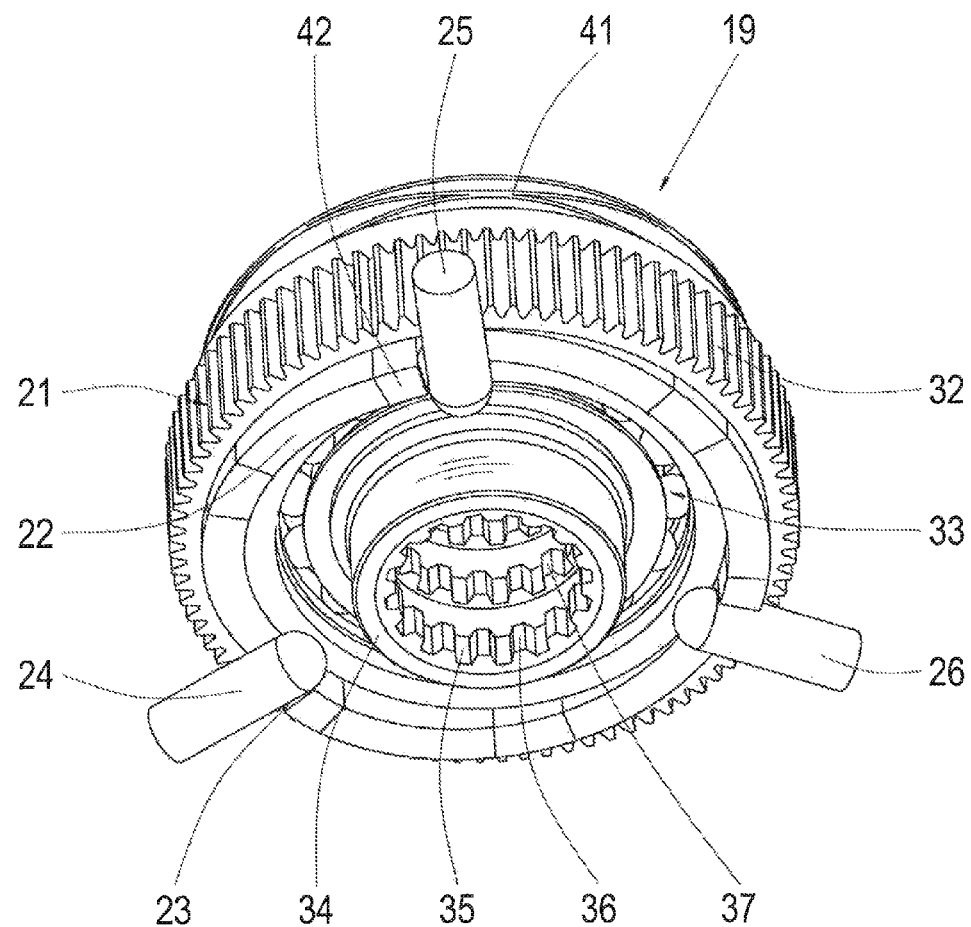
FIG. 5 a representation corresponding to FIG. 4 of a second embodiment of the drive converter device.

FIG. 5 shows a second embodiment of the drive converter device 19, with which the elements 24 to 26 abut on the cam disk 21 directly (i.e., without the roller bearings 27 to 29), and the operative connection is established between the elements 24 to 26 and the cam disk 21 through a slide bearing. Given the pin-shaped design of the elements 24 to 26, there is a line contact between the elements 24 to 26 and the cam disk 21.

Figure 6:
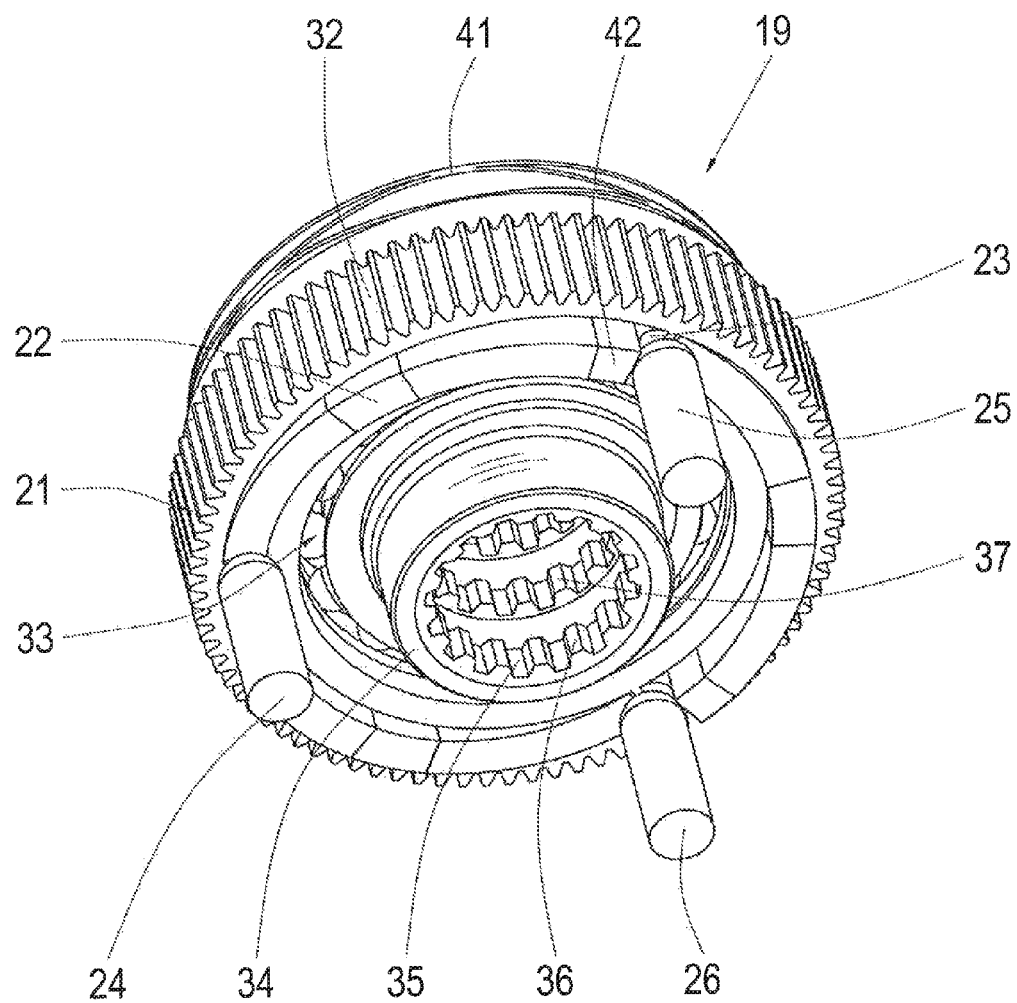
FIG. 6 a representation corresponding to FIG. 4 of a third embodiment of the drive converter device.

With the third embodiment of the drive converter device 19 represented in FIG. 6, the elements 24 to 26 are mounted on the housing side in a manner parallel to the operating direction of the cam disk 21 or perpendicular to the track areas 22 and 23 of the cam disk 21, and, in the area of their ends turned towards the cam disk 21, are formed in spherical cap shapes, at least in areas. Thus, there is a point contact between the elements 24 to 26 and the cam disk 21, by which the drive converter device 19, compared to the perpendicular arrangement of the elements 24 to 26 shown in FIG. 5, is operable to the axial operating direction of the cam disk 21 with lower frictional forces.

With the embodiments of the drive converter device 19 shown in the drawing, three elements 24 to 26 evenly distributed around the circumference of the cam disk 21 are provided; in each case, they are mounted in a manner fixed to the housing and an angle of 120° is provided between each of them. In deviation therefrom, it can also be provided that the cam disk 21 is formed with more than three first and second track areas and support elements in operative connection with each of them.

In addition, there is also the option of coupling the cam disk 21 with the sliding sleeve 34 through a slide bearing device, instead of through the roller bearing device, and opening or closing the shifting element 18, depending on the rotational movement and the axial adjustment of the cam disk 21.

Modifications and variations can be made to the embodiments illustrated or described herein without departing from the scope and spirit of the invention as set forth in the appended claims.

The invention claimed is:

1. A drive converter device in a transmission unit that converts rotational drive from a drive device into a translational actuation movement for a shifting element in the transmission unit, comprising:
   a cam disk rotationally driven by the drive device, the cam disk further comprising multiple track areas with defined gradients;
   the cam disk connected with at least one fixed-housing element that engages against the track areas;
   wherein the cam disk is translationally adjustable relative to the fixed-housing element with rotational movement of the cam disk by an amount that depends on the gradients of the track areas;
   a control sleeve within an internal diameter area of the cam disk; and
   a bearing mechanism concentric within the internal diameter area of the cam disk and engaged with the cam disk and the control sleeve such that the translational movement of the cam disk is transferable as translational movement to the control sleeve while the cam disk remains rotatable relative to the control sleeve, the translational movement of the control sleeve providing the translational actuation movement of the shifting element.

2. The drive converter device as in claim 1, further comprising a bearing unit configured between the fixed-housing element and the track areas.

3. The drive converter device as in claim 2, wherein the bearing unit is one of a slide bearing or a roller bearing.

4. The drive converter device as in claim 1, wherein the fixed-housing element is bolt-shaped element that engages against the track areas.

5. The drive converter device as in claim 4, wherein the bolt-shaped element is oriented longitudinally in a direction of translational movement of the cam disk.

6. The drive converter as in claim 1, further comprising a spring device that engages the cam disk to counteract translational movement of the cam disk resulting from rotational driving of the cam disk by the drive device.

7. A transmission device, comprising;
a shifting element configured to connect a shaft of a differential to a shaft of a vehicle wheel axle;
the shifting element actuated by a drive converter;
the drive converter further comprising:
  a cam disk rotationally driven by a drive device, the cam disk further comprising multiple track areas with defined gradients;
  the cam disk connected with at least one fixed-housing element that engages against the track areas;
  wherein the cam disk is translationally adjustable relative to the fixed-housing element with rotational movement of the cam disk by an amount that depends on the gradients of the track areas;
a control sleeve within an internal diameter area of the cam disk; and
a bearing mechanism concentric within the internal diameter area of the cam disk and engaged with the cam disk and the control sleeve such that the translational movement of the cam disk is transferable as translational movement to the shifting element through the control sleeve while the cam disk remains rotatable relative to the shifting element;
a bearing mechanism concentric within the internal diameter area of the cam disk and engaged with the cam disk and the control sleeve such that the translational movement of the cam disk is transferrable to the control sleeve while the cam disk remains rotatable relative to the control sleeve, the translational movement of the control sleeve providing the translational actuation movement of the shifting element.

8. The transmission device as in claim 7, wherein the shifting element is a positive-locking element.

9. The transmission device as in claim 8, wherein the drive device is an electric motor.

10. The transmission device as in claim 9, wherein the electric motor has an output shaft connected to the cam disk through a gear arrangement.

11. The transmission device as in claim 10, wherein the cam disk comprises a toothed gear that meshes with a gear wheel of the gear arrangement, the toothed gear having a width that accommodates axial movement of the cam disk.

* * * * *